United States Patent Office 3,148,947
Patented Sept. 15, 1964

3,148,947
METHOD FOR THE SEPARATION OF A COMPLEX-ING AGENT AND A METALLIC ION FROM THEIR COMPLEX
Herbert J. Fleischmann, St. Louis, Mich.
(59 Springhurst Ave., Toronto 3, Ontario, Canada)
No Drawing. Filed July 10, 1956, Ser. No. 596,850
6 Claims. (Cl. 23—125)

This invention relates to a method for the separation of an eluting agent and a metallic ion from their complex and, more particularly, to the recovery of an eluting agent and a metallic retaining ion from their complex resulting from the separation of a mixture of metallic ions by the use of an ion exchange resin.

Processes utilizing ion exchange resins are effective for the separation of rare earth elements; the transuranium elements; columbium and tantalum; potassium, rubidium and caesium; and other metallic elements which are difficult to separate by ordinary chemical methods. Ion exchange resins of both the cationic and the anionic types and eluting agents, sometimes termed "complexing agents," such as, for example, ethylene diamine tetra-acetic acid, n-hydroxyethyl ethylene diamine tetra-acetic acid, diethylene triamine pentaacetic acid, trinitrilo acetic acid, iminodiacetic acid, hydrazine diacetic acid and glycine are used in such processes.

In a typical process for the separation of the metals of the lanthanon group by the use of a cationic resin, at least two columns of the ion exchange resin are used. Preparatory to such a separation, the ion exchange resin in one of the columns, usually termed the loading column, is treated with an aqueous solution (solution A) of an ammonium salt, such as, for example, ammonium chloride, sodium chloride or potassium chloride to cause the ion exchange resin to absorb the ammonium ion, sodium or potassium ion, as the case may be. The ion exchange resin in the second column, usually termed the separation column, is treated with an aqueous solution (solution B) of a salt of a metal, such as, for example, copper sulfate, nickel sulfate, manganic chloride, ferric chloride, or the salt of any anion which can be displaced from the resin by the ions being separated by the use of the resin. Such a metallic ion may be termed a retaining ion. A plurality of separation columns connected in series is ordinarily used in the process, and the resin bed in the separation column or columns, as the case may be, is usually of a greater total height than that of the resin bed in the loading column.

An aqueous solution (solution C) containing a mixture of the lanthanon ions to be separated is then fed to the loading column. The lanthanon ions displace the retaining ions from the cationic resins as the solution moves down the column. This feed is continued until the cationic resin in the loading column is loaded with the lanthanon ions. The loading column is then fed with an aqueous solution containing the (solution D) ammonium, sodium or potassium ion and an eluting agent and the effluent passed through the separation column. This passage of the effluent causes the lanthanon ions to migrate into the separation column while separating themselves into bands, and to replace the retaining ions on the cationic resin. The effluent from the separation column is an aqueous solution (solution E) containing ammonium, sodium or potassium ions, hydroxium ions, the metallic retaining ion and the eluting agent. The desired lanthanon ions are then displaced from the cationic resin in the separation column by a feed of ammonium, sodium or potassium salt of the eluting agent.

The aqueous solution (solution E) containing the ammonium ion and the complex ion of the eluting agent which flows from the separation column prior to the displacement of the lanthanon ions from the column contains all of the retaining ion originally fed to the column and a proportion of the eluting agent which is determined by the relative volumes of the resin in the loading column and in the separation columns. Thus, when using three times as much resin in the separation column or columns as in the loading columns, the effluent solution (solution D) will contain three-fourths of the eluting agent originally used and the separated lanthanon solutions will contain the remaining one-fourth of the material.

The exact nature of the ionic constituents of this solution containing the retaining ion (solution E) depends upon its pH and, of course, upon the particular eluting agent used. Thus, the anion may be a complex of a cupric ion or of another metal retaining ion with ethylene diamine tetra-acetic acid, with n-hydroxyethyl ethylene diamine triacetic acid, with diethylene triamine pentaacetic acid or other eluting agent. This aqueous solution (solution E) containing the metallic retaining ion and the eluting agent has heretofore been disregarded, with the result that they are a significant and continually recurring factor in the cost of the ion exchange separation processes. Furthermore, both the eluting agents and the salt providing the retaining ion initially carry into the processes extraneous elements which adversely affect the efficiencies of the processes. Also, the practice of discarding the solutions containing the eluting agent and the metallic retaining ion creates a stream pollution problem which is often serious, due to the poisonous nature of some of the retaining ions.

It is the object of this invention to provide an efficient and inexpensive method for the recovery of the eluting agent and of the retaining ion which has been used in an ion exchange separation process employing an ion exchange resin.

A further object of this invention is to provide a method for the recovery of the eluting agent and the retaining ion which has been used in an ion exchange separation process which permits the reuse of both materials in further ion exchange separation, and, thereby, avoids both the waste of the materials and the further introduction of extraneous materials into the separation process.

Another object is to avoid the difficulties arising from stream pollution caused by discarding aqueous solutions of eluting agents and metallic retaining ions.

Other objects of this invention and its various advantageous features will become apparent from the detailed description which follows.

In principle, this invention comprises adsorbing the anionic complex of a metal retaining ion and an eluting agent resulting as a by-product of an ion exchange separation process on an ion exchange resin of the anionic type and splitting the anion to separate its metallic constituent, while it is still adsorbed on the resin, by treatment with an acid. The metal retaining ion is thereby separated from the ion exchange resin, leaving the eluting agent adsorbed thereon in its acid form. The eluting agent is then separated from the ion exchange resin by treatment with an aqueous solution of a basic material and recovered. Thus, the retaining ion and the eluting agent are recovered separately and are suitable for reuse in the further separation of metal ions by an ion exchange resin separation process.

By the method in accordance with this invention, an aqueous solution of an eluting agent and a metal salt is passed through a columnar bed of an anionic ion exchange resin to cause the adsorption of a complex ion comprised of the eluting agent and the metallic ion. The resin bed is then washed with water to remove all ions which are not absorbed on the resin. An aqueous solution of an acid is then passed through the resin bed which removes the metal carried by the ion exchange resin. The acid used for this elution step is chosen so as to give the salt of the metal retaining ion which is desired. The aqueous solution of the inorganic salt obtained by this step is, for example, suitable for reuse in the original ion exchange separation process, after any indicated adjustment in its pH and concentration.

The anion resin bed now carrying the eluting agent in its acidic form is again washed with water to remove all ions which are not adsorbed on the resin itself, and then treated with an aqueous solution of a base to cause the elution of the eluting agent from the resin as a corresponding salt. The particular base used for this elution step may be chosen to give the salt of the eluting agent desired for reuse in the original separation process. The aqueous solution of the salt of the eluting agent obtained by this step is also suitable for reuse in the original ion exchange separation process after any indicated adjustment in its pH and concentration.

Anionic ion exchange resins which are particularly suited for use in the method of this invention constitute an insoluble organic matrix bearing a large number of active anionic groups, such as, quaternary ammonium groups, ion-substituted guanidinium groups, etc. in which the ionizable component (e.g. $Cl^-$, $OH^-$) is capable of being replaced by other anionic species. Thus, for example, the resin used may consist of a polymer of polystyrene cross-linked with approximately 8%, by weight, of divinyl benzene, which has been chloromethylated, reacted with an amine and then with an alkyl halide to form a polymeric quaternary ammonium compound.

The resin bed which is used in the method of this invention is prepared by placing a finely divided anionic ion exchange resin, in a column, preferably one made of glass, through which the color of the resin can be observed, and back-washed with water to remove fine particles of the resin which tend to impede the flow of a liquid through the resin bed and to cause the resin to pack uniformly in the column. The resin bed can be repeatedly reused in the batch-wise recovery of an eluting agent and a retaining ion by this method, with periodic back-washing to avoid excessive packing.

The cupric ion is frequently used as a displacement ion in the ion exchange resin separated of metallic ions of, for example, the lanthanon group. Ethylene diamine tetra-acetic acid is also frequently used as an eluting agent in such separation. When using these materials, the solution which has heretofore been discarded as a by-product of the ion exchange separation process is a dilute solution containing the cupric ion complexed with ethylene diamine tetra-acetic acid, as well as the cupric ion and the anion of ethylene diamine tetra-acetic acid. This solution is blue in color. In passing through an ionic resin bed, this solution loses its color and the resin itself takes on a blue or blue-green color as the anion of copper-ethylene diamine tetra-acetic acid complex is adsorbed on the resin, while the effluent from the column is colorless.

In carrying out this method, the aqueous solution of the salt of the eluting agent is passed through the anionic ion exchange resin bed until the resin of the bed is substantially loaded with the complex anion. This solution may have a pH within the range of about 2.0 to about 12.0. It is usually desirable not to completely load the column with the complex anion, since the complex anion containing the original retaining ion requires less ion exchange resin for complete retention than is required by the anion of the eluting agent after the removal of the retaining ion. When a column of resin fully loaded with the complex anion is treated with an aqueous solution of an acid to remove the retention ion, some of the eluting agent will pass out of the column along with the salt of the retaining ion, since there is insufficient resin present to fully retain it in the column.

The point at which the column is substantially loaded with, for example, complex anion of copper and ethylene diamine tetra-acetic acid is readily apparent from a visual inspection of the column of resin. As the solution flows downwardly through the resin column, the resin first becomes blue or blue-green at the top of the bed and the color progresses downwardly through the column. When the column nears the bottom of the column of resin, it is loaded with the complex copper anion to the desired extent.

The aqueous solution of acid which is passed through the resin bed to split the adsorbed salt of the eluting agent and remove its metal ion may be, for example, sulfuric acid, hydrochloric acid, hydrobromic acid, lactic acid, glycollic acid, citric acid, trichloro acetic acid or any other acid which has stronger acidic properties than the eluting agent itself, having a concentration within the range of about 0.05% to about 10%, by weight, and preferably within the range of about 1% to about 6%, by weight. The aqueous solution of a base which is used to elute the acidic eluting agent may be, for example, a solution of ammonium hydroxide, sodium hydroxide, potassium hydroxide, a mixture of potassium, rubidium and caesium hydroxides, or other mixtures of hydroxides or basic salts thereof, having a concentration within the range of about 0.1% to about 12%, by weight. An aqueous solution of ammonium hydroxide having a concentration of about 3%, by weight, has been found to be entirely satisfactory for this purpose. The water which is used in back-washing the anionic resin, in washing the resin bed after the absorption of the salt of the eluting agent and in removing the acid and the inorganic salt formed by splitting the complex anion of the eluting agent should preferably be substantially free of metallic ions to avoid contaminating the anionic resin and the aqueous solutions produced by this method.

The method in accordance with this invention is illustrated by the following example, which is given solely for the purposes of illustration.

*Example I*

A vertical glass column one inch in diameter and twenty inches long was loaded with an anionic resin of the strong base type ("Amberlite IRA-140" produced by the Rohm & Haas Co., Philadelphia, Pa.), and back-washed with substantially ion-free water to secure a uniform packing of the resin. Six-hundred milliliters of an aqueous solution containing 1%, by weight, of ethylene diamine tetra-acetic acid and its stoichiometric equivalent of cupric ions and having a pH of 2.3, resulting as a by-product of the separation of metallic ions of the lanthanon group by the use of a cationic type of ion exchange resin was then passed downwardly through this column. The anionic resin assumed a blue-green color and the effluent from the column was colorless, showing that the complex cupric anion was adsorbed on the resin. Distilled water was then run through the column until the pH of the effluent washwater was substantially the same as that of the entering water. One liter of an aqueous solution of sulfuric acid having a concentration of 2.0%, by weight, was then passed through the column to elute the cupric ion from the resin as cupric sulfate. Approximately 90%, by weight, of the copper contained in the original feed was recovered and found to be extremely pure copper by spectrographic analysis. The column of anionic resin was again washed with distilled water until the pH of the effluent was substantially the same as that of the feed water. A total of 1510 milliliters of an aqueous solution of ammonium hydroxide having a concentration of 5%, by weight, was then passed through the column, and the effluent solution of the ammonium salt of the ethylene diamine tetraacetic acid collected in successive fractions. The ethylene diamine tetra-acetic acid in each of these successive fractions was precipitated by treating the solution with concentrated hydrochloric acid. Spectroscopic analysis of these fractions showed that of the total of 50.88 grams of ethylene diamine tetra-acetic acid recovered, representing 84.8% of the acid contained in the original feed solution, 32 grams were spectrographically free of copper.

As demonstrated by the foregoing example, it is possible by the use of a relatively small column of an anionic resin to completely separate the metal retaining ion from the eluting agent contained in the aqueous solutions resulting from separation of other metallic ions by the use of an ion exchange resin. By the use of a larger column of an anionic resin, it also makes possible a substantially quantitative recovery of the metallic retaining ion, as well as of that part of the eluting agent which binds the metal retaining ion. This is the major percentage of the eluting agent used in such an ion exchange separation process. The only part of the eluting agent which is not recovered by the use of this method is that which is combined with metallic ions which are separated by the original ion exchange separation process. Both the aqueous solution carrying the retaining ion and that carrying the eluting agent resulting from this method are directly reusable in the original process for the separation of metallic ions with adjustments in pH and in concentration.

The portion of the eluting agent which is combined with the metallic ions which are separated by the original ion exchange separation process may also be recovered by this method in separate operations which substantially duplicate the procedure described hereinbefore for the recovery of the retaining ion and the portion of the eluting agent combined therewith. This recovery of the portions of the eluting agent combined with these separated ions makes possible the complete recovery of the eluting agent used in the original separation and has no deleterious effect on the purity of the separated metallic ions. In those cases where a residue of the eluting agent or its oxidation product or its decomposition product has a deleterious effect on the separated metallic ions, such recovery of the eluting agent is advantageous, since the ions may be entirely freed of all residual eluting agent by this procedure.

The materials consumed in the process are the acid and the basic material used in the elution steps, both of which are relatively inexpensive, whereas the metallic retaining ion and, particularly, the eluting agent recovered are relatively expensive. Therefore, the method in accordance with this invention avoids the waste of expensive materials and reduces the cost of separating metallic ions by the use of ion exchange resins. Furthermore, this method eliminates the problem of disposing of the aqueous solutions of the retaining ion and the eluting agent and that of stream pollution which frequently arises from such disposal.

As brought out hereinbefore, the method in accordance with this invention results in a solution of the retaining ion which is spectrographically free of other metallic ions. While the foregoing is directed to the description of the application of my method to the elimination of the waste heretofore incurred in discarding the by-product solutions from ion exchange separation containing a metallic retaining ion and an eluting agent and the pollution problems arising therefrom, it will be obvious to those skilled in the art that this invention provides an efficient method for the production of solutions of a wide variety of metallic ions and the metals themselves, which are spectrographically free of other metallic ions. Since this method for the purification of the ions does not depend upon separation by means of chemical reactions, it is useful for the production of solutions of metallic ions and of the metals themselves, which are difficult, if not impossible, to obtain in a spectrographically pure state by the usual chemical methods.

It will also be obvious in view of the foregoing description of the recovery of the eluting or complexing agent and the metal retaining ion resulting as a by-product of ion exchange separations, that my method is equally applicable to the separation of complexed metallic ions resulting as by-products of other types of processes. For example, this method is valuable in the recovery of the metallic ions and of the complexing agent from the aqueous solutions of complexed metal ions resulting as by-products of electroplating operations in which nickel, copper, chromium, silver, gold and other metals are electroplated. It is of particular value in connection with the poisonous chrome plating baths and the equally poisonous gold cyanide baths.

In the foregoing, I have specifically exemplified the method in accordance with this invention and mentioned alternative materials which I may use in carrying it out for the purpose of fully illustrating the method, but it will be understood that alternative materials may be used and variations made in the details of the procedure without deviating from the spirit of my invention or the scope of the following claims.

I claim:

1. A method for the recovery of a metal retaining ion and a salt of ethylene diamine tetra-acetic acid from an aqueous solution of the salt of the said acid and the retaining ion formed as a by-product of an ion exchange separation process, which comprises the steps of adsorbing the salt on an ion exchange resin of the anionic type, splitting the salt and eluting the metal retaining ion from the ion exchange resin while leaving ethylene diamine tetra-acetic acid adsorbed thereon by treating the resin with an aqueous solution of a water-soluble acid and recovering the resulting aqueous solution of the salt of the retaining ion, washing the resin free of any residual acid and salt, treating the resin with an aqueous solution of a water-soluble base of elute therefrom the ethylene diamine tetra-acetic acid and recovering the resulting aqueous solution of the salt of ethylene diamine tetra-acetic acid.

2. A method for the recovery of a metal retaining ion and a salt of n-hydroxethyl ethylene diamine triacetic acid from an aqueous solution of the salt of the said acid and the displacement ion formed as a by-product of an ion exchange separation process, which comprises the steps of adsorbing the salt on an ion exchange resin of the anionic type, splitting the salt and eluting the metal retaining ion from the ion exchange resin while leaving n-hydroxyethyl ethylene diamine triacetic acid adsorbed thereon by treating the resin with an aqueous solution of a water-soluble, mineral acid and recovering the resulting aqueous solution of the salt of the retaining ion, washing the resin free of any residual mineral acid and salt, treating the resin with an aqueous solution of a water-soluble base to elute therefrom the n-hydroxethyl ethylene diamine triacetic acid and recovering the resulting aqueous solution of the salt of n-hydroxyethyl ethylene diamine triacetic acid.

3. A method for the recovery of a metal retaining ion and a salt of diethylene triamine pentaacetic acid from an aqueous solution of the salt of the said acid and the retaining ion formed as a by-product of an ion exchange separation process, which comprises the steps of adsorbing the salt on an ion exchange resin of the anionic type, splitting the salt and eluting the metal retaining ion from the ion exchange resin while leaving diethylene triamine pentaacetic acid adsorbed thereon by treating the resin with an aqueous solution of a water-soluble, mineral acid and recovering the resulting aqueous solution of the mineral acid salt of the retaining ion, washing the resin free of any residual acid and salt, treating the resin with an aqueous solution of a water-soluble base to elute therefrom diethylene triamine pentaacetic acid and recovering the resulting aqueous solution of the salt of diethylene triamine pentaacetic acid.

4. A method for the recovery of the cupric ion and a salt of ethylene diamine tetra-acetic acid from an aqueous solution of the cupric salt of the said acid formed as a by-product of an ion exchange separation process which comprises the steps of adsorbing the salt on an ion exchange resin of the anionic type, splitting the salt and eluting the cupric ion from the ion exchange resin while leaving the ethylene diamine tetra-acetic acid adsorbed thereon by treating the resin with an aqueous solution of a water-soluble acid and recovering the resulting aqueous solution of the cupric salt, washing the resin free of any residual acid and salt, treating the resin with an aqueous solution of a water-soluble base to elute therefrom the ethylene diamine tetra-acetic acid and recovering the resulting aqueous solution of the salt of ethylene diamine tetra-acetic acid.

5. A method for the recovery of the cupric ion and a salt of ethylene diamine tetra-acetic acid from an aqueous solution of the cupric salt of the said acid formed as a by-product of an ion exchange separation process which comprises the steps of adsorbing the salt on an ion exchange resin of the anionic type, splitting the salt and eluting the cupric ion from the ion exchange resin while leaving the ethylene diamine tetra-acetic acid adsorbed thereon by treating the resin with an aqueous solution of a water-soluble mineral acid having a concentration within the range of about 0.05%, by weight, to about 10%, by weight, and recovering the resulting aqueous solution of the cupric salt of the mineral acid, washing the resin free of any residual mineral acid and salt, treating the resin with an aqueous solution of a water-soluble base having a concentration within the range of about 1% to about 12%, by weight, to elute therefrom the ethylene diamine tetra-acetic acid and recovering the resulting aqueous solution of the salt of ethylene diamine tetra-acetic acid.

6. A method for the recovery of the cupric ion and the ammonium salt of ethylene diamine tetra-acetic acid from an aqueous solution of the cupric salt of the said acid formed as a by-product of an ion exchange separation process which comprises the steps of adsorbing the salt on an ion exchange resin of the anionic type, splitting the salt and eluting the cupric ion from the ion exchange resin while leaving the ethylene diamine tetra-acetic acid adsorbed thereon by treating the resin with an aqueous solution of sulfuric acid having a concentration within the range of about 0.05%, by weight, to about 10%, by weight, and recovering the resulting aqueous solution of cupric sulfate, washing the resin free of any residual sulfuric acid and cupric sulfate, treating the resin with an aqueous solution of ammonium hydroxide having a concentration within the range of about 1% to about 12%, by weight, to elute therefrom the ethylene diamine tetra-acetic acid and recovering the resulting aqueous of the ammonium salt of ethylene diamine tetra-acetic acid.

References Cited in the file of this patent
UNITED STATES PATENTS

| 2,694,681 | Bray et al. | Nov. 16, 1954 |
| 2,798,789 | Spedding et al. | July 9, 1957 |
| 2,873,170 | Hyde et al. | Feb. 10, 1959 |